US009279257B2

(12) United States Patent
Baker

(10) Patent No.: US 9,279,257 B2
(45) Date of Patent: Mar. 8, 2016

(54) APPARATUS AND METHOD FOR COATING A MATERIAL WITH RESIN AND APPLYING THE COATED MATERIAL TO A SURFACE

(71) Applicant: SIKA TECHNOLOGY AG, Baar (CH)

(72) Inventor: Bruce E. Baker, East Brunswick, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/068,717

(22) Filed: Oct. 31, 2013

(65) Prior Publication Data

US 2015/0118401 A1 Apr. 30, 2015

(51) Int. Cl.

| | |
|---|---|
| ***E04F 13/00*** | (2006.01) |
| ***E04F 13/02*** | (2006.01) |
| ***B29C 65/52*** | (2006.01) |
| ***B32B 37/12*** | (2006.01) |
| ***B32B 43/00*** | (2006.01) |
| ***C08J 5/00*** | (2006.01) |
| ***C09J 5/00*** | (2006.01) |
| ***B05C 3/02*** | (2006.01) |
| ***E04D 15/04*** | (2006.01) |
| ***B05C 3/12*** | (2006.01) |

(Continued)

(52) U.S. Cl.
CPC ................ *E04D 15/04* (2013.01); *B05C 3/125* (2013.01); *B05C 11/045* (2013.01); *E04D 15/06* (2013.01)

(58) Field of Classification Search
CPC ......... E04D 11/02; E04D 15/04; E04D 15/06; E04F 15/16; B29C 66/43; B29C 70/086; B29C 70/34; B32B 27/12; B32B 2581/00; B05C 3/12; B05C 3/125; B05C 11/04; B05C 11/041; B29B 15/122; D06B 3/10; D06B 2700/27
USPC ............... 156/71, 307.1, 307.3, 307.5, 307.7; 118/404, 405, 413, 429; 427/434.4, 427/434.7
See application file for complete search history.

(56) References Cited

U.S. PATENT DOCUMENTS

| | | | |
|---|---|---|---|
| 1,309,858 | A | 7/1919 | Jones |
| 2,462,297 | A | 2/1949 | Adams |
| 2,489,985 | A | 11/1949 | Speight, Jr. |

(Continued)

FOREIGN PATENT DOCUMENTS

| | | | |
|---|---|---|---|
| DE | 20 2005 000 952 | U1 | 9/2005 |

OTHER PUBLICATIONS

Machine Translation of DE 202005000952 (Sep. 14, 2014).*

(Continued)

*Primary Examiner* — Sing P Chan
(74) *Attorney, Agent, or Firm* — Buchanan Ingersoll & Rooney PC

(57) ABSTRACT

A device for saturating material with resin and subsequently laying the saturated material onto a surface includes a frame and a vessel for retaining the resin attached to the frame. The vessel has a slot sized and configured so that material is passable through the slot after being coated with resin retained in the vessel. A first guide member is positioned adjacent the slot and a second guide member is positioned adjacent the slot and is spaced apart from the first guide member to define a passageway between the first and second guide members. The passageway is sized and configured for the material to be passable through the passageway and out of the device for laying on the surface. Embodiments of the device can be usable for methods of waterproofing and/or roofing.

19 Claims, 9 Drawing Sheets

(51) Int. Cl.
*B05C 11/04* (2006.01)
*E04D 15/06* (2006.01)

(56) References Cited

U.S. PATENT DOCUMENTS

| | | | | |
|---|---|---|---|---|
| 2,766,721 | A * | 10/1956 | Paquette | 118/405 |
| 3,081,191 | A * | 3/1963 | Smith et al. | 427/369 |
| 3,148,104 | A | 9/1964 | Rapp | |
| 3,908,044 | A * | 9/1975 | Gunning | 427/209 |
| 4,448,363 | A * | 5/1984 | Mukenschnabl | 242/422.6 |
| 5,584,152 | A * | 12/1996 | Baerveldt | 52/396.05 |
| 6,332,992 | B1 * | 12/2001 | Chatelain | 264/69 |

OTHER PUBLICATIONS http://www.kemper-system.com/IN/eng/technology/kemperator/, retrieved on Oct. 31, 2013, 1 pg.

International Search Report for PCT/EP2014/073283 dated Jan. 29, 2015.

Written Opinion of the International Searching Authority for for PCT/EP2014/073283 dated Jan. 29, 2015.

* cited by examiner

APPARATUS AND METHOD FOR COATING A MATERIAL WITH RESIN AND APPLYING THE COATED MATERIAL TO A SURFACE

FIELD

The present innovation relates to a device and method for saturating a material with a resin and applying the saturated material to a surface.

BACKGROUND INFORMATION

Roofing and waterproofing may include applying a liquid resin to reinforcing fabric that is laid to help waterproof a roof, plaza deck, park deck, or other surface. Resins such as Sikalastic® 601, 621, 624 and 641 resins that are made and sold by Sika Corporation, are examples of liquid resins that may be used to coat a fabric or fleece to help waterproof a structure, help waterproof a roof, or help reinforce a surface.

A fabric or other material may be coated by having a liquid resin applied to a sheet of material during the laying of the material onto a surface or subsurface of a structure. Resin stored in a bucket may be brushed or rolled onto the surface prior to laying the material on the surface and resin may also be brushed or rolled onto that sheet of material after the sheet of material was placed on the surface, for example. A device such as a Kemperator machine sold by Kemper System GmbH & Co. KG, may also be used to coat a material with resin and subsequently apply the resin coated material to a surface.

SUMMARY

A device for coating material with resin and subsequently laying the material saturated with the resin onto a surface comprises a frame and a vessel for retaining the resin attached to the frame. The vessel has a slot sized and configured so that material is passable through the slot after being coated with resin retained in the vessel. A first guide member is positioned adjacent the slot. A first portion of the first guide member is curved adjacent to the slot. A second guide member is positioned adjacent the slot and is spaced apart from the first guide member to define a passageway between the first and second guide members. The passageway is sized and configured for the material to be passable through the passageway and out of the device for laying on the surface. A first portion of the second guide member is curved adjacent to the slot. The first portion of the first guide member and the first portion of the second guide member are curved so that a pre-specified amount of resin is saturated in the material prior to the material being emitted from the device and laid on the surface.

A method of applying a reinforcing material for waterproofing or roofing of a structure may include the steps of: coating material with a liquid resin via a device and laying the material saturated with the resin on a surface or a subsurface of the structure via the device. The device may comprise a frame and a vessel for retaining the resin attached to the frame. The vessel may have a slot sized and configured so that material is passable through the slot after being coated with resin retained in the vessel. A first guide member can be positioned adjacent the slot and a first portion of the first guide member may be curved adjacent to the slot. A second guide member can be positioned adjacent the slot and may be spaced apart from the first guide member to define a passageway between the first and second guide members. The passageway may be sized and configured for the material to be passable through the passageway and out of the device for laying on the surface. A first portion of the second guide member may be curved adjacent to the slot. The first portion of the first guide member and the first portion of the second guide member may be curved so that a pre-specified amount of resin is forced into the material prior to the material being emitted from the device and laid on the surface to saturate the material with the resin.

Other details, objects, and advantages of the innovation will become apparent as the following description of certain exemplary embodiments thereof and certain exemplary methods of practicing the same proceeds.

BRIEF DESCRIPTION OF THE DRAWINGS

Exemplary embodiments of a device for coating a material and applying the material saturated with the resin to a surface and associated exemplary methods are shown in the accompanying drawings. It should be understood that like reference numbers used in the drawings may identify like components, wherein.

Other details, objects, and advantages of embodiments of the innovations disclosed herein will become apparent from the following description of exemplary embodiments and associated exemplary methods.

DETAILED DESCRIPTION

I have determined that a new device is needed for coating a material such as a fabric or a fleece, with a liquid resin and for applying the material saturated with the resin to a surface for roofing or for waterproofing of a structure such as a park deck, plaza deck, or other surface that may be composed of concrete, wood, metal, a composite material, a combination of different materials, or other type of material. In some exemplary embodiments of my device, the device is configured to permit the device to be easily and effectively cleaned after its use so that the same device may be used repeatedly for different projects requiring use of different types of liquid resin without requiring extensive time for cleaning of the device. To this end, I have determined that it can be advantageous for embodiments of the device to not include rotatable rollers or other moveable parts for pressing against a sheet of material for the device to coat and subsequently lay the material as used in prior art devices such as the Kemperator machine. Embodiments of my device may be relatively light so that the device is easily maneuverable and transportable so a worker may easily move the device for saturating a sheet of material and laying that sheet of saturated material onto a surface for waterproofing or for roofing.

Figure 1:
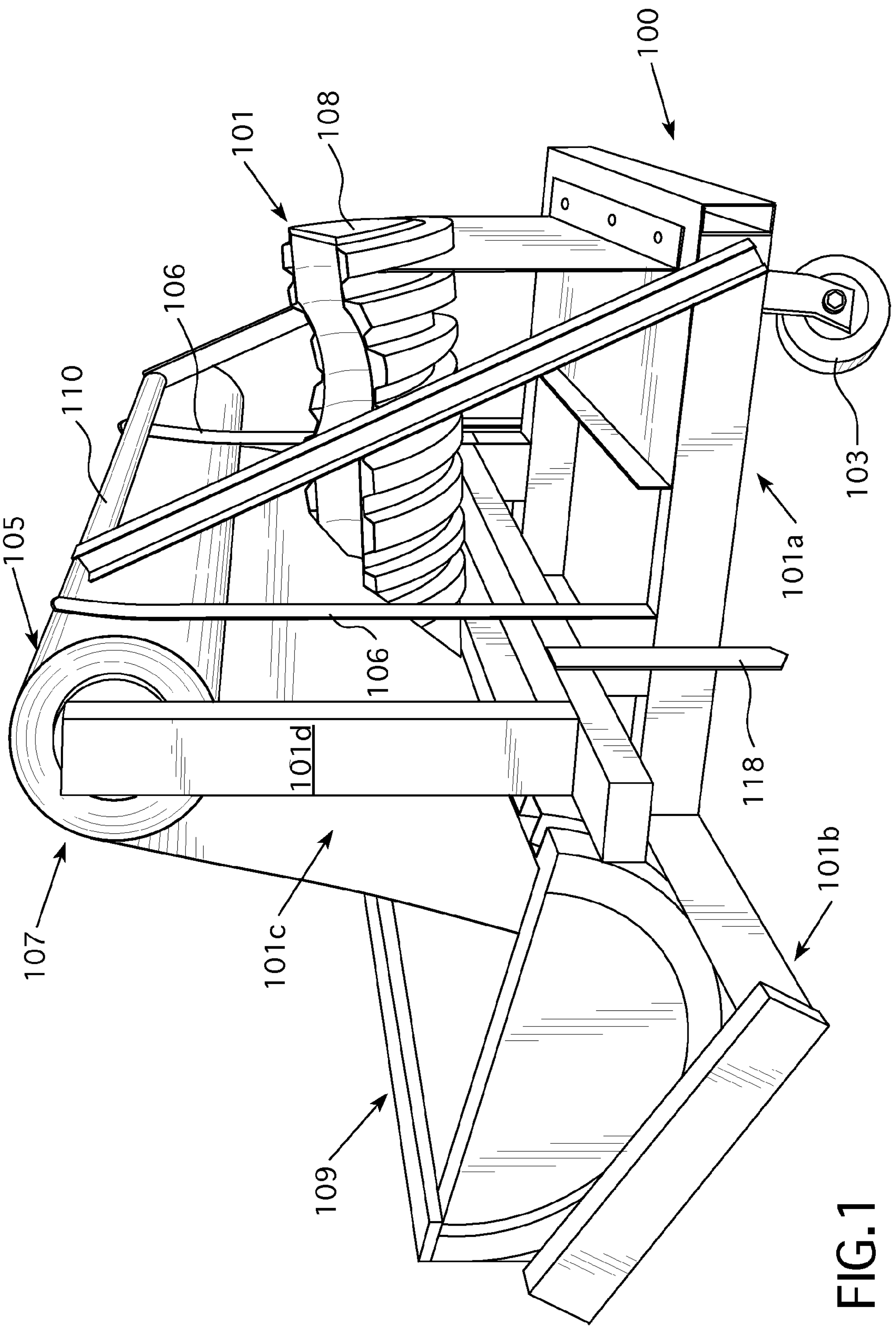
FIG. 1 is a side perspective view of a first exemplary embodiment of my device for coating a sheet of material and applying that sheet of material to a surface.
Figure 2:
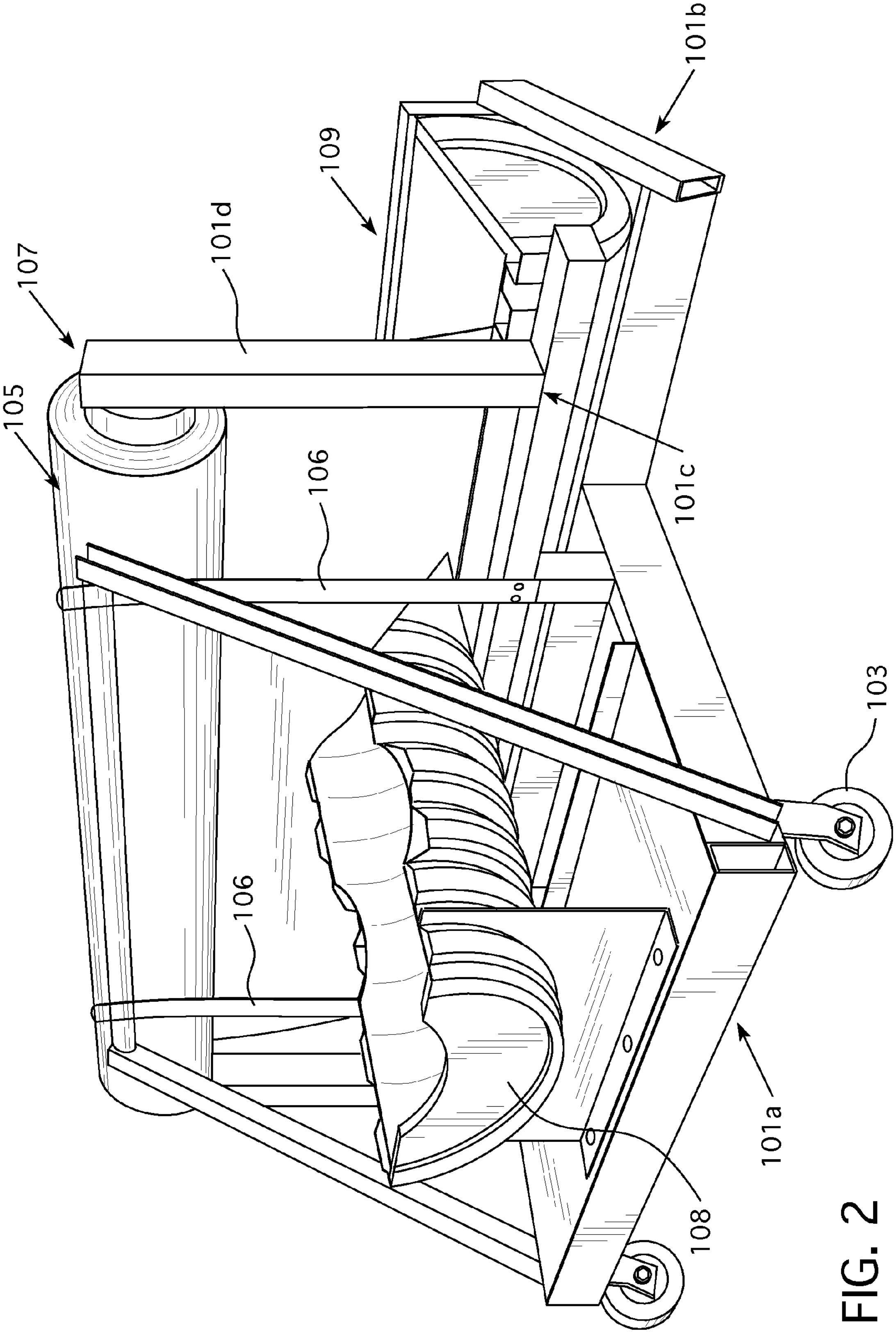
FIG. 2 is a rear perspective view of the first exemplary embodiment of my device.
Figure 3:
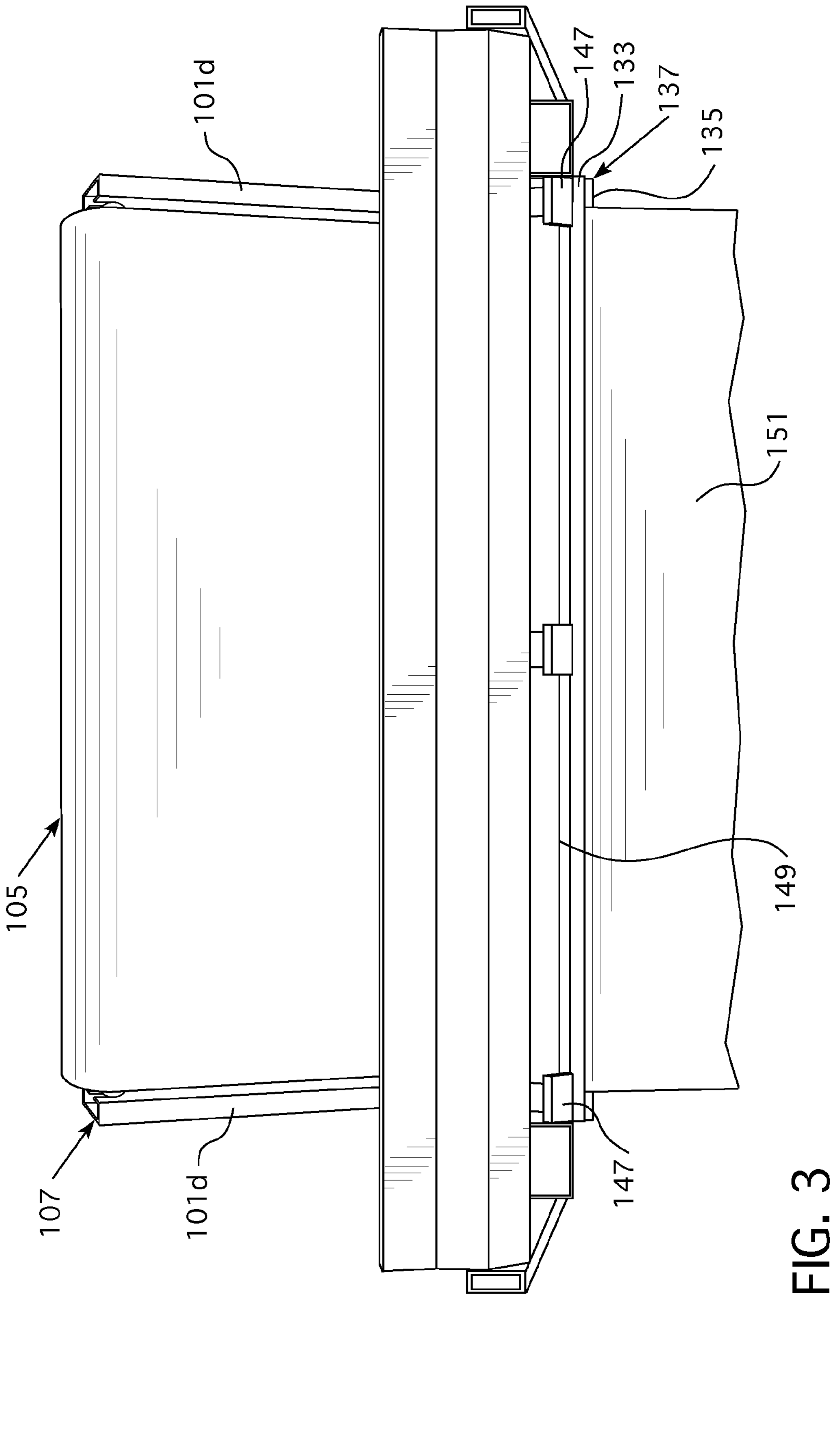
FIG. 3 is a front perspective view of the first exemplary embodiment of my device.
Figure 4:
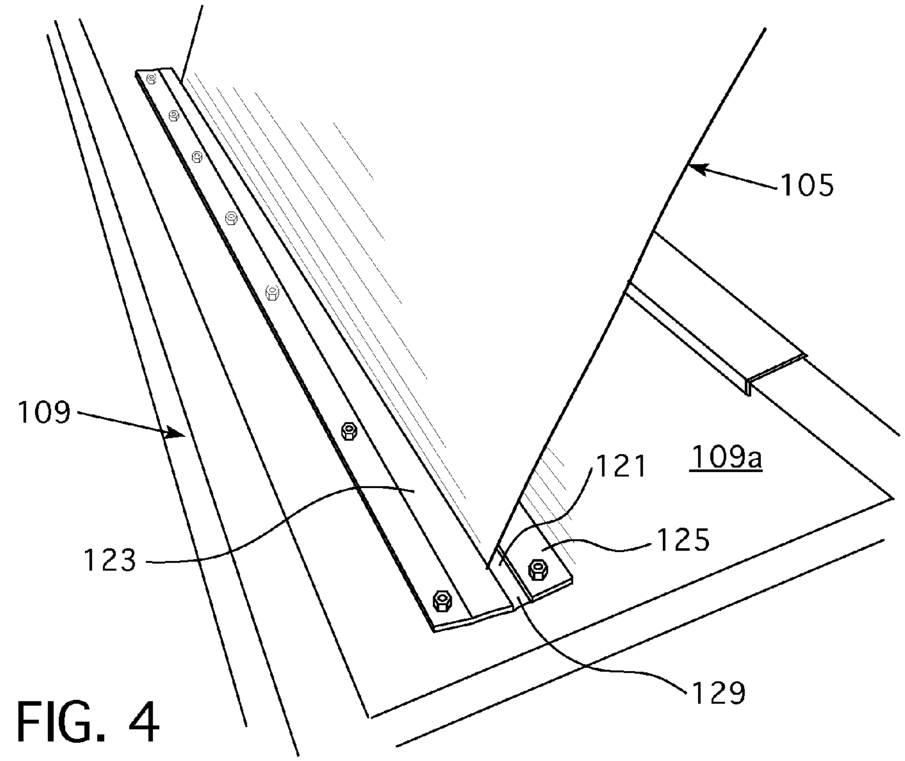
FIG. 4 is an elevated front fragmentary view of the first exemplary embodiment of my device that illustrates the slot of the vessel through which material may pass as the material is coated with resin and subsequently laid onto a surface.
Figure 5:
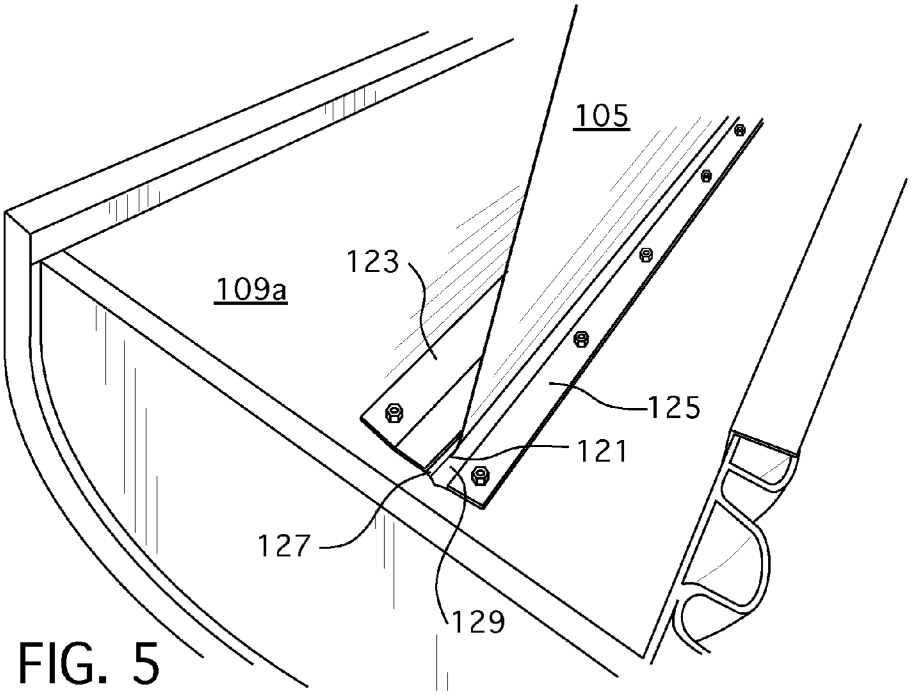
FIG. 5 is an elevated side fragmentary view of the first exemplary embodiment of my device that illustrates the slot of the vessel through which material may pass as the material is coated and subsequently saturated with resin and subsequently laid onto a surface.
Figure 6:
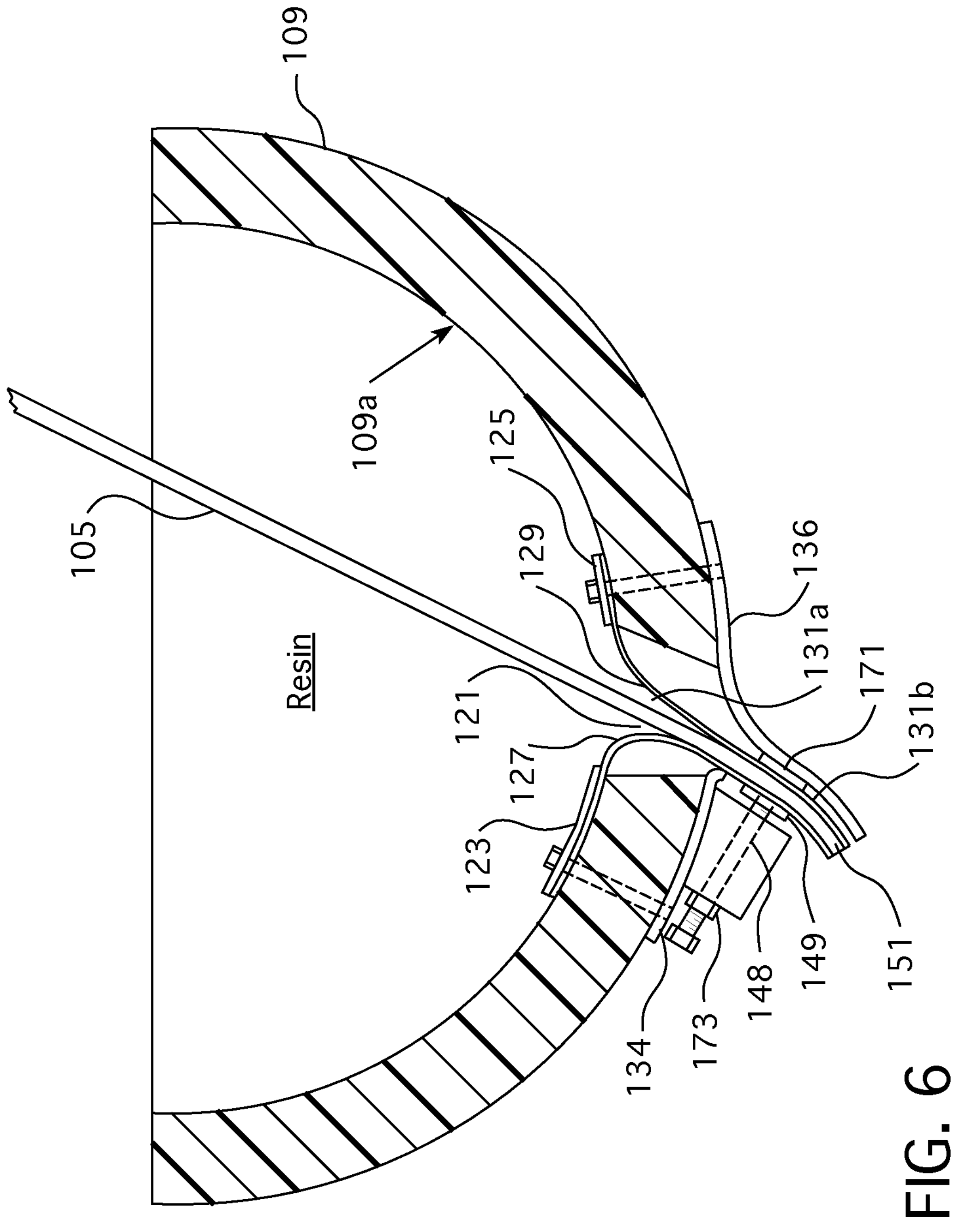
FIG. 6 is a cross sectional view of the first exemplary embodiment of my device that illustrates two spaced apart guide members that are curved for defining a passageway through which material may pass after having contacted resin within the vessel and prior to being laid onto a surface by the device.
Figure 7:
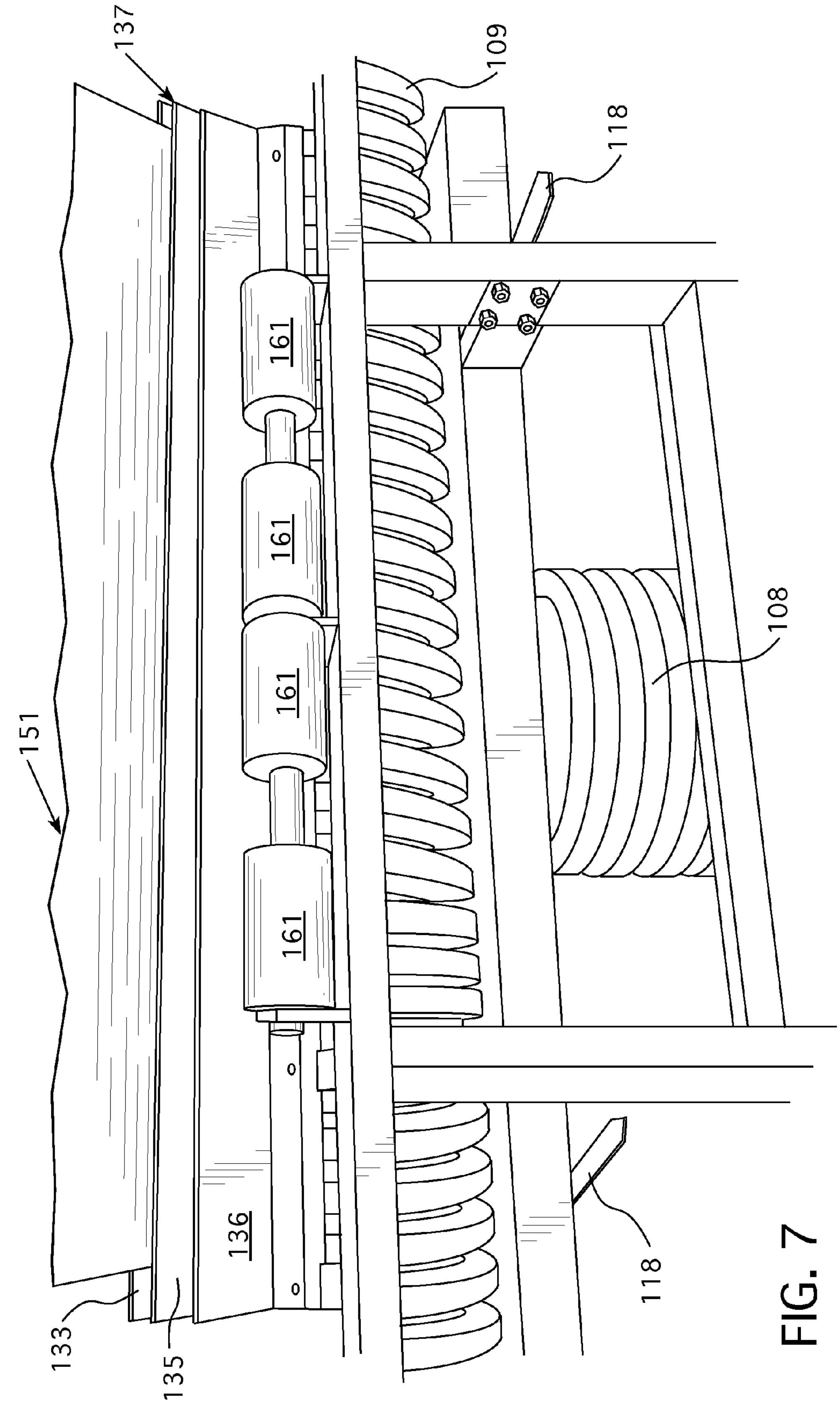
FIG. 7 is a bottom perspective view of the first exemplary embodiment of my device.
Figure 8:
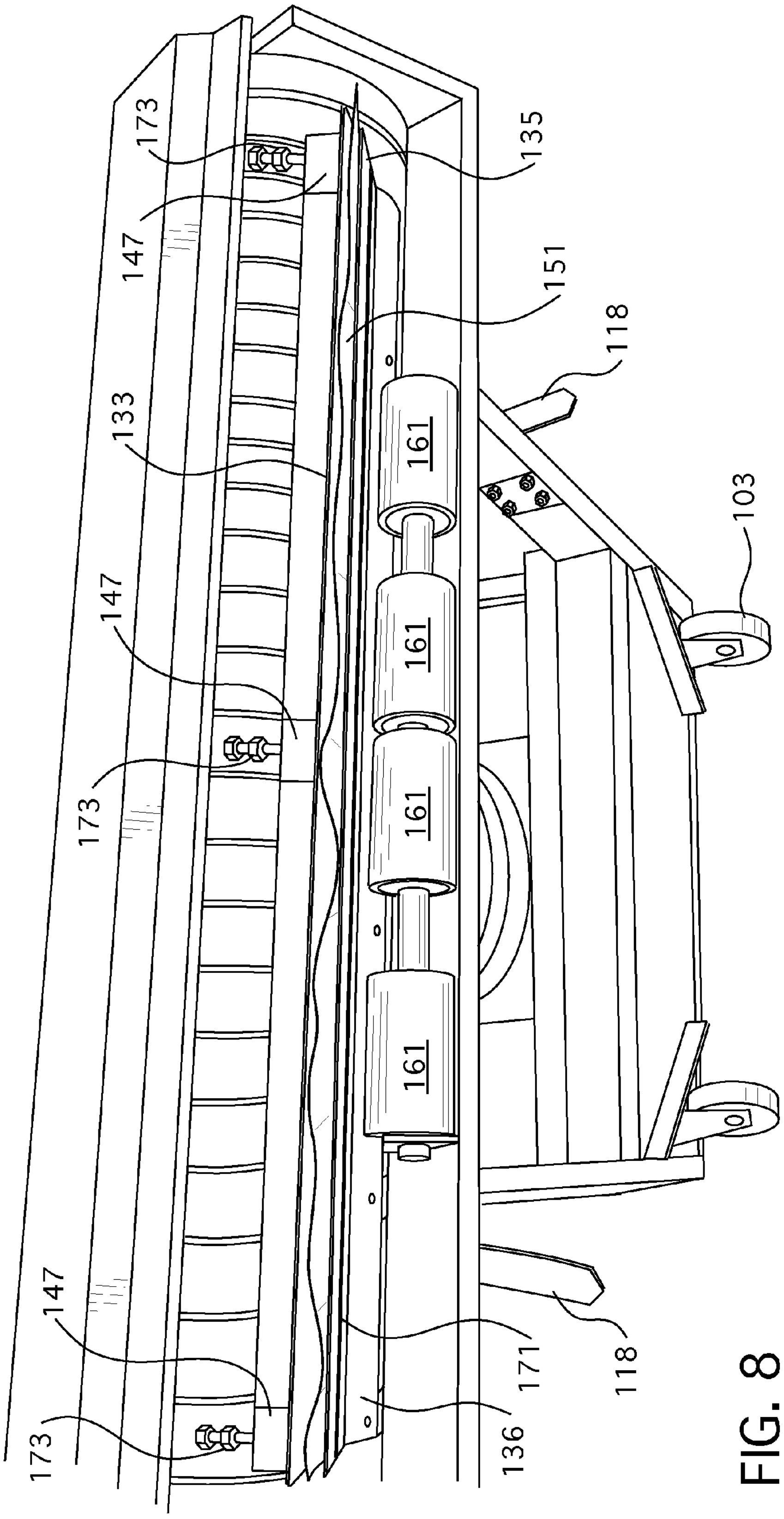
FIG. 8 is a bottom front perspective view of the first exemplary embodiment of my device.
Figure 9:
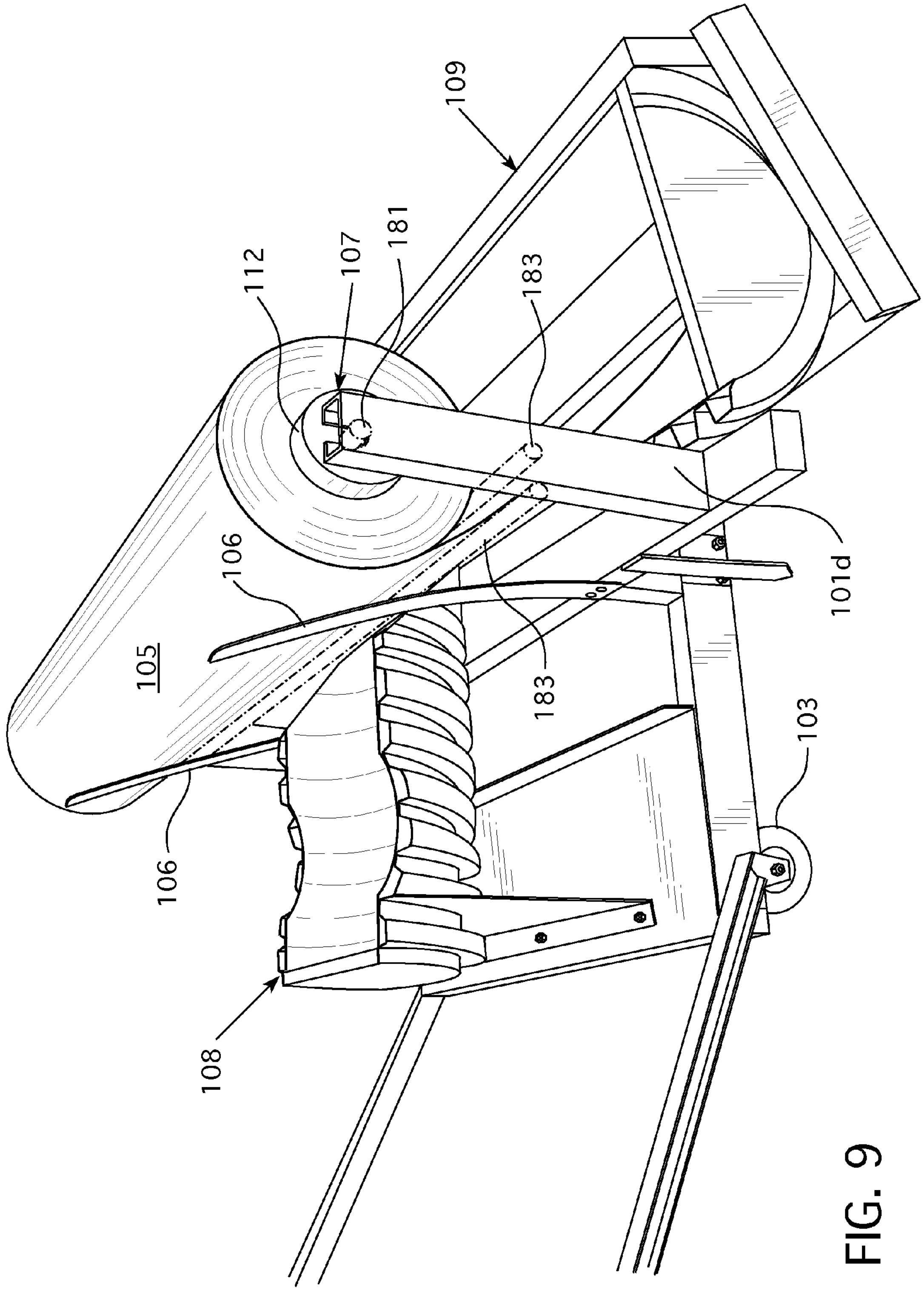
FIG. 9 is a side perspective view of the first exemplary embodiment of my device.
Figure 10:
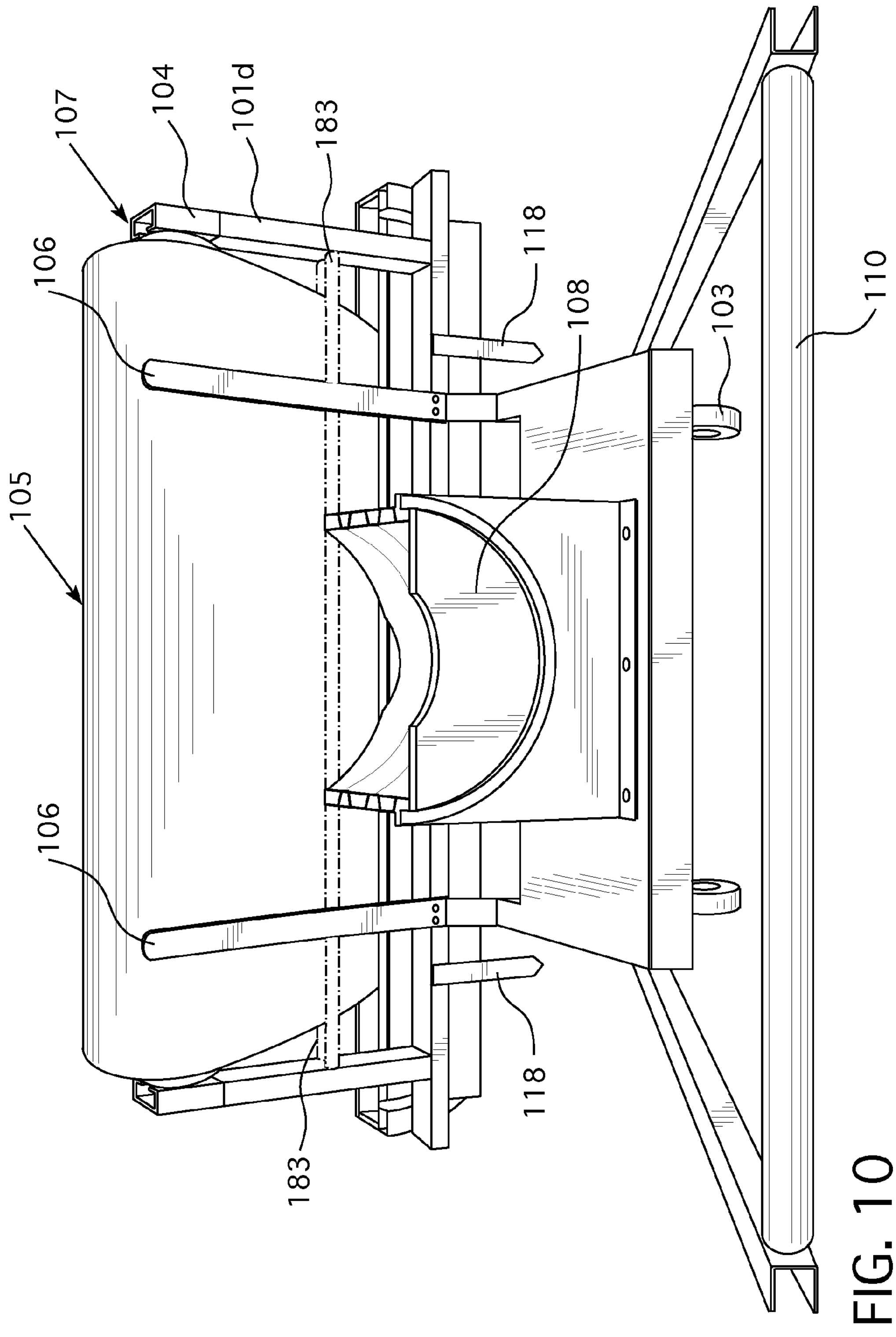
FIG. 10 is a rear perspective view of the first exemplary embodiment of my device.

Referring to FIGS. 1-10, an exemplary embodiment of my device 100 that is configured for coating material with a resin and subsequently laying or otherwise applying that material saturated with the resin onto a surface of a structure such as a roof, floor of a deck, or a subsurface of a structure may include a frame 101 that is attached to wheels 103 so that the device 100 is moveable along the surface for applying the coated material. One or more of the wheels 103 may be rotatably or pivotally attached to the frame 101 so that the frame is moveable and easily steerable. Alternatively, the wheels 103 may be non-swivealable or non-pivotally attached to the frame 101 so that the device is easily moveable in a line or along a linear path. The frame 101 may also be configured so that the device 100 has a relatively low center of gravity.

A handle 110 may be attached to the frame and be moveable from a stowed position to an operative position. When in the operative position, a user may grasp the handle 110 to push or pull the device and steer the device. A user may manually grab the handle 110 to move the handle from the stowed position to the operative position. Screws or nuts used to fasten the handle 110 to the frame 101 may be tightened or loosed to lock and unlock the handle's position for adjusting the position of the handle. Alternatively, a different handle locking mechanism may be utilized to lock and unlock the handle for adjusting the position of the handle 110.

Pointers 118 may be positioned adjacent opposite sides of the frame 101. The pointers 118 may include a lower distal end that has a demarcation or indicia, such as a particular pre-selected color or other indicia that a user may use for a visual identification of where ends of materials will be laid when the device is operated and moved along a path. The pointers 118 may provide a visual indicator that helps the user steer the device to facilitate the laying of saturated material and to help overlay edges of immediately adjacent rows of laid material.

The frame 101 may include a first portion 101*a* that is attached to a second portion 101*b* and a third portion 101*c*. The first portion 101*a* may define or support a platform on which containers that can contain a liquid resin or other liquid for coating the material may be placed. If the device is motorized, the platform may alternatively permit a user to stand on the device as it is controlled for movement and applying of the resin saturated material onto a surface. The second portion 101*b* of the frame may support a vessel 109 in which liquid resin may be contained for coating the material and the third portion 101*c* of the frame 101 may support the roller 107 or other tube of material holder about which a roll of material 105 is positioned. The third portion 101*c* of the frame may include a plurality of arms 101*d* that vertically extend from a bottom portion of the frame. Upper ends of the arms may have a rollable rod, pipe, or an affixed non-movable rod, pipe, bar, beam or other roll of material holding member extending between the arms. The rod or pipe extending between the two arms may be removable from the arms for inserting through a tube about which the material 105 is wound for attachment of the material to the arms. If the rod or pipe is not rotatable, it may not have an interference fit with the tube of the material 105 so that the tube of material is able to rotate about the non-moving rod or pipe for unwinding of the material 105. In some other embodiments, the tube of material holding member may be configured as a roller 107 that is positioned through the central channel of the tube of material 105 and may rotate to help facilitate rolling of the tube of material.

Upper ends of each arm 101*d* of the frame may be open and define an inner slot or notch 181, sized to retain and support distal ends of the rod or pipe that is inserted through a roll of material. An example of such a notch 181 is shown in broken line in FIG. 9. The upper ends of the arms 101*d* may be configured to stay open to facilitate positioning of the tubes of material and removal of used tubes after the material has been laid. Distal ends of the roller 107 that is positioned through a central channel of a tube of material may be inserted into the slots or notches 181 of the arms 101*d* to position the tubes into the arms for being supported by the arms 101*d*. Alternatively, a removable locking cap member may be removably attached to the upper ends of the arms to help lock the tubes of materials to the arms. The caps may be disconnected from the arms to change out tubes of material and subsequently reattached to the upper ends of the arms to help keep the tubes of material attached to the arms 101*d*.

Spacers 112 may also be provided for attachment to the rod, pipe or other roller 107 or other type of tube of material holding member that is extendable through tubes of material for positioning the tube of material on the device 100 to be held by the arms 101*d* of the frame 101 of the device. The spacers 112 may be positioned on opposite ends of the roller 107 adjacent opposite ends of a tube of material positioned on the roller 107 to help centrally locate the roll of material 105 for feeding the material through the slot 121 of the vessel and through the passageway 131 for laying saturated material on a surface. The spacers 112 may also help accommodate different sized rolls of material.

One or more tension members 106 may be attached to the frame 101 or other part of the device and have distal ends that contact the material 105 supported on the roller 107 to prevent the material from being moved by wind or other environmental factors or becoming folded to help keep the material 105 on the roller 107 and prevent creasing of the material to facilitate better laying of the saturated material out of the device. The tension members 106 may be, for example, elongated leaf spring elements, elongated resilient metal members that are biased to come into contact with material on the roller 107, or other resilient members or spring members.

The vessel 109 may be sized and configured as a trough, a tank, or other container that is capable of retaining liquid resin poured into the vessel 109 for at least a certain period of time. The vessel 109 may be composed of a non-stick material such as a high density polyethylene material or may have the resin containing surface lined with such a material. As another example, the vessel 109 may be composed of a metal such as steel and have the resin containing surface of the vessel coated with a synthetic fluoropolymer or a fluoropolymer (e.g. Teflon® material, polytetrafluoroethylene) or other non-stick material. The roller 107 may rotate so that a sheet of material 105 may be unrolled from the roller 107, pass through the vessel 109 to be coated with resin, and subsequently be applied to a surface such as a subsurface of a floor or a roof. Alternatively, the roller 107 may be replaced with a non-rotating member that is sized to hold the tube of material 105 and permit that tube of material to rotate about that non-moving member. A rear trough 108 or other vessel may also be attached to the frame 101 and be configured to permit resin to be poured into the vessel 109 from a rear of the material 105 to compliment feeding of resin that can be poured into the front of the vessel 109 so that both front and rear surfaces of the material 105 may be proficiently coated by resin in the vessel 109.

As an alternative to manually pouring resin from buckets into vessel 109 and trough 108 for feeding into the vessel 109, one or more pumps may be communicatively connected to containers of resin via conduits such as flexible tubes or hoses for feeding resin into the vessel 109 via one or more than one conduit to facilitate feeding resin to the vessel 109 or ensuring sufficient resin is within the vessel 109 to coat front and rear surfaces of the material and saturate the material with resin as it is passed through the slot 121 and passageway 131.

The material 105 may be any of a number of different types of material. For example, the material may be a membrane, a fabric, or a fleece material.

The material 105 may pass through the vessel 109 and out of a slot 121 formed in the bottom 109*a* of the vessel 109. The bottom 109*a* of the vessel 109 may include a front portion that defines a front edge of the slot 121 and a rear portion that defines a rear edge of the slot 121 within the bottom of the vessel 109. Front and rear rigid attachment members 123 and 125 may be positioned on top of the bottom 109*a* of the vessel 109 to cover the front and rear portions of the vessel that define the slot 121. The front and rear rigid attachment members 123 and 125 may be stainless steel strips or other members that are bolted, screwed, or otherwise fastened to the vessel 109 and may be used for attaching other elements to the vessel 109. Fasteners may extend through the rigid attachment members for attaching other elements of the device to the vessel in addition to attaching the rigid attachment members to the vessel 109.

Two spaced apart guide members extend from above the slot 121 and into the slot 121 and are curved adjacent to and below the slot 121 to define a passageway 131 to guide material through passageway 131 and out of the device and onto a surface. A first guide member 127 and second guide member 129 may define the passageway 131 through which a coated sheet of material may pass so that the material may be saturated with resin as it passes through the passageway 131 and subsequently out of the device for being laid onto a surface. The first and second guide members 127 and 129 may each be composed of ultra-high density polyethylene, or a non-stick material that will not bond to the resin so that the passageway and guide members may be easily cleaned after the device is used for any particular waterproofing application or roofing application so that the device may be easily reused. As another alternative, the material contacting surface of the guide members that define the passageway 131 may be coated with a non-stick material to facilitate the easy cleaning of the guide members. The first and second guide members 127 and 129 may each be configured as vanes, plates, or other structures that each includes a curved portion adjacent and below the slot 121 of the vessel 109. In some embodiments, the first and second guide members 127 and 129 may not be cylindrical in shape and may not be configured as a roller in some embodiments of the device 100.

A proximate end of the first guide member 127 may be attached to the front rigid attachment member 123 adjacent the slot 121 of the vessel and may extend from that position to a distal end 133. The proximate end of the second guide member 129 may be attached to the rear rigid attachment member 125 adjacent the slot 121 and extend to a distal end 135. The first and second guide members may be curved between their proximate and distal ends to facilitate saturating the coated material as it passes through slot 121 and through a passageway 131 defined between the first and second guide members.

Only one of the first and second guide members may be configured to be immovably attached to the vessel 109 of the device 100 adjacent the slot 121 so that only one of the first and second guide members 127 and 129 is able to move in conjunction with the vessel 109 also moving (e.g. the guide members do not move relative to the vessel 109). In other embodiments, both of the first and second guide members 127 and 129 may be moveably attached to the frame 101 and/or to the vessel 109 to permit adjustment of the width of the passageway 131. In yet other embodiments, both the first and second guide members may be immovably attached to the vessel 109 so that both guide members are unable to move relative to the vessel 109 and a size of the passageway 131 is not adjustable.

The first guide member 127 may be immovably positioned adjacent to the bottom of the vessel 109 and may be immovably affixed to the vessel 109 via screws, bolts, welding, or other fastening mechanism. Alternatively, a distal end of the first guide member 127 may be attached to or contact an adjustment mechanism that permits the distal end of the first guide member 127 to be moveably attached to the vessel 109 so that the first guide member 127 is moveable relative to the second guide member 129 and/or the vessel 109.

The second guide member 129 may be affixed to a portion of the vessel or the frame adjacent the slot 121. In some embodiments, a distal end of the second guide member may be moveably attached to the vessel 109 to permit the width of the passageway 131 to be adjusted. In other embodiments, the distal end of the second guide member 129 may be immovably affixed to the vessel 109 and/or the frame 101. In one contemplated embodiment, both the first and second guide members 127 and 129 may be immovably affixed to the vessel 109 so that both the first and second guide members 127 and 129 are not moveable relative to each other and/or relative to the vessel 109. In other embodiments, at least one of the first and second guide members are moveably attached to the vessel 109 and/or frame 101 to permit adjustment of the width of the passageway 131.

At the terminal end of the passageway 131, an outlet 137 may be defined between a terminal distal end 133 of the first guide member 127 and a terminal distal end 135 of the second guide member 129. A sheet of saturated material 151 may be fed out of this defined outlet 137 and onto a surface.

An adjustment mechanism may be attached to the distal end of one or both of the first and second guide members 127 and 129. For instance, an adjustment mechanism may include multiple attachment bodies 147 and a metal bar or other rigid element 149 that extends from adjacent a first end of the outlet 137 to the other, second end of the outlet 137 opposite the first end. Each attachment body 147 may be attached to the vessel 109 and include a retractable and extendable member 148 that is moveable to contact the rigid element 149 or the distal end of the first guide member 127 so that the retractable and extendable members 148 may moveably position the first guide member 127 an adjustable distance from the second guide member 129 to define a width of the passageway 131 and outlet 137. The retractable and extendable member 148 may be adjustable bodies that are connected to the vessel 109 via attachment bodies 147, an attachment plate 134 positioned between the attachment bodies 147 and vessel 109 and screws, bolts, or other fastening mechanism that may extend from the vessel 109 and/or front rigid attachment member 123 for attaching the retractable and extendable bodies 148 to the vessel 109. Locking elements 173 such as jam nuts may be attached to the extendable members 148 and moveably positioned on the members to adjust the extent to which the extendable members 148 extend out of attachment bodies 147 and lock the position of the extendable members 148 to prevent the extendable members from moving when the device is in use. It should be understood that some embodiments of the device may include a different type of adjustment mechanism.

Other embodiments of the device 100 may not include any adjustment mechanism for adjusting the width of the passageway 131 or outlet 137 of the passageway 131. The distal end 133 of the first guide member 127 may be affixed to or contact a bar, rod, or other elongated member or rigid elongated component of the frame 101 that is configured to provide rigidity to the distal end 133 of the first guide member 127. A bar or other elongated structure may also extend along the width of the distal end 135 of the second guide member 129 to provide rigidity to that second guide member 129. Alternatively, no such rigidity improving member may be positioned adjacent the distal end 135 of the second guide member 129.

A portion of the first and second guide members 127 and 129 may each be curved adjacent to and below the slot 121. The curvature of each guide member may be configured to facilitate the saturating of a pre-specified desired amount of liquid resin by squeezing the resin into the top and bottom sides of the sheet of material. The coated sheet of material may contact the curved surfaces of the first and second guide members, which can prevent too much resin from being saturated into the material. As such, the first and second guide members 127 and 129 may be sized and configured as bladders or vanes for ensuring a layer of resin having a pre-specified thickness completely saturates the material and coats the top and bottom surfaces of the material.

The first and second guide members 127 and 129 may be configured so that they are spaced apart from each other and define a passageway 131 through which the coated sheet of material moves for saturating the material with resin prior to being emitted from the outlet 137 and laid onto a surface. The passageway 131 may define a passageway that extends downwardly to help facilitate movement of the sheet of material. For instance, a first portion 131*a* of the passageway 131 may extend horizontally and vertically downward from the slot 121 and a second portion 131*b* of the passageway 131 may be in communication with the first portion 131*a* and be straight and extend along a declined slope from the first portion 131*a* to the outlet 137.

The first and second guide members 127 and 129 may each be curved to define the first portion 131*a* of the passageway 131 so that the first portion 131*a* of the passageway is a curved passageway. The portions of the first and second guide members 127 and 129 that define the second portion 131*b* of the passageway 131 may be straight or generally straight to help define a second passageway portion 131*b* that extends from the first portion 131*a* of the passageway 131 to the outlet 137 of the passageway 131. The second portion 131*b* of the passageway 131 may be declined to help facilitate laying of the coated material 105.

A first rigid bar, rod or other rigid element 149 may be composed of metal such as stainless steel or aluminum and extend along a distal end of the first guide member 127. The first rigid element 149 may be more rigid that the first or second guide members 127 and 129. A second rigid bar, rod, plate, or other rigid element 136 may also extend along the distal end of the second guide member 129. The second rigid element may also be more rigid than the first and second guide members. The first rigid element 149 may contact a guide member to engage the guide member to move the guide member for adjusting of the guide member. For instance, a bolt, screw, or other member that is retractable and extendable from body 147 may contact the first rigid element 149 to cause the first rigid element 149 to move to adjust a position of the distal end of a guide member. The rigid elements can help maintain the spacing and position of the guide members during operation of the device and ensure the passageway has a desired width during operations in the event the guide members are composed of a resilient or flexible material.

The second rigid element 136 may be attached to the vessel 109 via one or more screws, bolts or other fasteners extending from rear rigid attachment member 125 to the second rigid element 136. The second rigid element may be positioned below the second guide member 129 to contact a distal end portion of the second guide member 129 to help provide support to the second guide member 129. The second rigid element may be, for example, a shaped plate, elongated structure, or sheet of material, such as a sheet of aluminum or stainless steel that may provide support to the second guide member 129.

Resilient layers 171 of material such as a thin sheet of silicon foam rubber may be positioned between the rigid elements and the guide members. The resilient layers 171 may be positioned to permit a better fit of the guide member and rigid element attached to the guide member. The resilient layers 171 may also facilitate the feeding of material 105 through the passageway 131 and out of outlet 137. The resiliency provided by a resilient layer 171 can help open up space within the passageway when initially passing material 105 through the device or when changing rolls of material 105 to facilitate output of saturated material out of the outlet 137. The resilient layer 171 also helps ensure uniform pressure is applied via a rigid element to the distal end of a guide member during operations.

Front wheels 161 may also be attached to a front portion of the frame below the vessel and near the middle of the vessel 109. The front wheels may have a smaller diameter or otherwise be smaller than the rear wheels of the device. The smaller front wheels may permit the material to be output via the outlet 137 closer to the floor, and improve the center of gravity of the device for movement of the device when coating and laying material. The smaller front wheels 161 may be cylindrical in shape in some embodiments and be attached to a front, bottom portion of the frame via an axle or other elongated element that extends between two sides of the frame to position the smaller wheels below the vessel 109 and outlet 137 of the passageway 131.

It is contemplated that embodiments of the device may be configured for manual movement and steering. Alternatively, a motor may be connected to at least some of the wheels to drive rotation of the wheels and move the device. The motor may be an electric motor that is operated by a battery or other electricity generating source. Alternatively, the motor may be an internal combustion engine motor that is powered by a fuel such as diesel, gasoline, or other fuel.

It is also contemplated that one or more wheels 103 may be pivotally attached to the frame 101 so that the wheels may be turned to facilitate steering of the device or all may be non-pivoting so the device more easily tracks in a straight path. In some embodiments, two wheels, four wheels, or only one wheel, for example, may be pivotally attached to the frame (e.g. swiveled) for steering of the device 100. A steering wheel or other steering mechanism may be coupled to the wheels so that a user may actuate turning of the wheels via movement of the steering wheel or other steering mechanism.

For some embodiments of the device, it may be desired to increase the weight of the device to make steering or movement of the device occur in a more continuous or smooth fashion or to improve the balance of the device. Weights may be attached to different parts of the frame to add weight to the device 100 to improve the balance of the device or otherwise facilitate smooth movement and steering of the device 100.

It should be appreciated that methods of operating an embodiment of my device can include obtaining a tube or core of a roll of reinforcing fabric or reinforcing membrane. A tubular holder may be passed through the core of this roll of material and placed in vertical mounting arms 101*d* defined by the third portion 101*c* of the frame 101. The material is then pulled down to and through the slot 121 at the bottom of the vessel 109 and passed between the first and second guide members 127, 129 through passageway 131 and extended onto a surface of a substrate such as a roof substrate or deck substrate. The width of the passageway 131 may be adjusted to meet the particular thickness of the material if an adjustment mechanism is included in the device 100. Liquid resin may then be poured into the vessel 109 to form a resin bath within the vessel that surrounds the reinforcement material. The device is subsequently pulled along a substrate surface and material saturated with the liquid resin in which resin is coated on both the top and bottom surfaces of the material extends through the slot 121 in the vessel, through the passageway 131 between the spaced apart first and second guide members 127 and 129, and out of the outlet 137 for laying onto the substrate surface. The output sheet of resin coated material is adhered to the surface via the liquid resin. Additional liquid resin and material may be added as required for a particular project. Use of the device 100 may therefore limit the amount of manual finishing and manual placement of material that is needed. Further, the device may be configured to lay the material so that a minimal amount of pressing on the material via rollers is needed to remove any air bubbles and spread out any excess resin. If an adjustment mechanism is included in the device for adjusting the width of the outlet 137 and passageway 131, the adjustment mechanism may be actuated to adjust the outlet width 137 and passageway width 131 to achieve a particularly desired output of material from the device that may meet a particular objective for a specific waterproofing application project or roofing project.

Any type of liquid resin that is suitable to meet a design criteria of a given project may be retained in the vessel 109 for coating and saturating the material. For example, Sikalastic® 601, 621, 624 and 641 resins sold by Sika Corporation may be retained in the vessel 109. Of course, other liquid resins used in waterproofing and roofing applications may also be used.

It should be understood that the sheet of material may be material fed from a roll of fabric or a roll of membrane that is applied to a substrate to reinforce a structure or improve roofing and/or waterproofing of the structure (e.g. a deck or roof). The sheet of material may have a pre-specified width or may be of any of a number of suitable widths and may have a length defined by the roll on which the material is wound or an amount of material needed for laying coated material onto a particular portion of a surface.

In some embodiments of the device, anti-wrinkling elements may be included to prevent the material from wrinkling due to wind or other environmental factors that could exist when the device is used to lay resin saturated material on a surface. For instance, generally cylindrical members 183, which are shown in broken line in FIGS. 9-10, may be positioned on the front and rear of the device. The generally cylindrical members 183 may have a first end attached to one arm 101*d* and a second end attached to the opposite arm 101*d* adjacent the front and rear sides of the arms 101*d*. The cylindrical members 183 may be configured as anti-wrinkling elements and may be non-rotationally affixed to the arms 101*d*. The cylindrical members 183 may be spaced apart from each other to define a gap. The gap may be sized to have a width between the rear and front cylindrical members 183 that may be within the range of 0.15 centimeters (cm) to 0.20 cm (e.g. 60 mils to 80 mils). Of course, the gap could alternatively be sized to be below this range or above this range. The material 105 may be unrolled from a roll of material and pass through the gap formed between the two cylindrical members 183.

The cylindrical members 183 may help prevent wind from affecting the material as it is passed into the vessel 109 and prevent wrinkling of the material. The cylindrical members 183 may be rods or pipes or tubes. In other embodiments, the cylindrical members 183 may be replaced with other types of anti-wrinkling elements such as bars, beams or other structures that define at least one gap located below the roll of material held by the arms 101*d* and above the vessel 109 through which the material may pass prior to passing into the vessel 109 to be coated with resin and subsequently saturated with resin as the coated material is passed through the passageway 131. One or both of the cylindrical members 183 may be adjustably attached to the arms 101*d* so that the size or width of the gap formed between the cylindrical members may be adjusted. For instance, the front or rear cylindrical member 183 may be moveably attached to each arm 101*d* so that that cylindrical member is able to move forwardly and rearwardly relative to the other cylindrical member 183 to adjust a size of the gap to be as small as 0.15 cm or as large as 0.20 cm. Of course, other adjustable gap size ranges could alternatively be utilized.

It should be appreciated that any of the above noted features of my device in any particular embodiment expressly discussed herein may be combined with other features or elements of other embodiments except when such a combination would be mutually exclusive or otherwise incompatible therewith as may be appreciated by those of at least ordinary skill in the art. Elements of embodiments of my device may also be configured so that they may be easily replaced for repairs or maintenance. For instance, the first and second guide members, rigid element 149 and other elements may be attached to the vessel 109 and/or frame 101 to permit these components to be easily removed and a replacement part put in the removed part's place as well as permit quick and easy removal and reassembly. It should also be appreciated that different variations to the above discussed embodiments may be made to meet a particular set of design criteria. For instance, in some embodiments of the device, the frame 101 may also support a reservoir in which liquid resin is kept. A pump may feed resin from the reservoir to the vessel 109 to maintain the resin at a pre-specified level within the vessel 109 during operations of the device 100. The pump may be in communication with a tote in which resin is retained that is supported by the frame of the device or may be in communication with a supply of resin retained in a large tank or tote that is remote from the frame (e.g. resin stored in a large truck by a work site or a large tote) and feed the resin from that remote tank to the vessel 109 via flexible hosing, tubing or other conduit connections connecting the pump between the vessel 109 and the remote tank. As another example, the frame 101 of the device may be composed of stainless steel or aluminum to reduce or eliminate the potential for rust development. As yet another example, the first and second guide members 127 and 129 may be configured as guide vanes that are constructed to allow for easy removal and replacement.

As yet another example, the front wheels 161 of the device may be affixed to the frame 101 while the rear wheels may be swiveled to the frame to permit easy steering of the device or may all be non-swivably attached. The outlet 137 of the device may also be positioned relatively low to the ground so that the coated material laid onto a surface only travels a limited distance from the device to the surface on which the coated material is being laid, which can help reduce air entrapment under the laid material or wind uplift of the material.

As yet another example, all surfaces of the device that may contact the liquid resin (e.g. inner walls of the vessel 109, surfaces of the first and second guide members 127 and 129 that define the passageway 131) may be composed of non-stick material to help aid cleaning of the device after its use.

As yet another example, embodiments of the device may include a moveable blocking element that is able to block the slot 121 or passageway 131 to prevent resin retained in the vessel 109 from leaking out of the slot 121 or passageway 131. An actuator may be attached to this blocking element to move this element from a blocking position to an open position. For instance, a cable may extend from the blocking element to a handle that is moveable to move the blocking element from an open position to a closed position and vice versa.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A device for coating material with resin and subsequently laying the material saturated with the resin onto a surface comprising:

a frame that is configured to be moveable adjacent to the surface;

a vessel for retaining the resin attached to the frame, the vessel having a slot sized and configured so that material is passable through the slot after being coated with resin retained in the vessel;

a first guide member positioned adjacent the slot, a first portion of the first guide member being curved adjacent to the slot;

a second guide member positioned adjacent the slot and being spaced apart from the first guide member to define a passageway between the first and second guide members, the passageway extending from below the slot to an outlet defined by the first and second guide members adjacent to a front of the device, the passageway sized and configured for the material to be passable through the passageway and out of the device for laying on the surface, a first portion of the second guide member being curved adjacent to the slot such that the passageway has a first portion that is curved and extends downwardly and forwardly from the slot and a second portion that extends linearly and forwardly from the first portion of the passageway to the outlet;

wherein the first portion of the first guide member and the first portion of the second guide member are curved to define the first portion of the passageway so that a pre-specified amount of resin is saturated into the material prior to the material being emitted from the outlet of the passageway and laid on the surface; and wheels connected to the frame that are configured to contact the surface on which the material saturated with the resin is to be laid and wherein the second portion of the passageway is declined as it extends from the first portion of the passageway to the outlet.

2. The device of claim 1 wherein the material has a first side and a second side opposite the first side, wherein the slot is defined in the bottom of the vessel, the first and second guide members extending below the slot, and wherein the vessel is configured so that the resin coats both the first side and the second side of the material prior to the material passing through the slot of the vessel.

3. The device of claim 1 wherein the first and second guide members are non-rotationally attached to the frame.

4. The device of claim 3 wherein the first and second guide members are immovably attached to the vessel so that the first and second guide members cannot move relative to the vessel.

5. The device of claim 1 further comprising:

a plurality of tension members attached to the frame, each tension member configured to contact a portion of the material wrapped around a tube supported by the frame, the tube of the material supported by the frame so that the tube of the material is above the vessel and material is extendable from the tube and into the vessel for passing through the slot and the passageway for being coated and subsequently saturated with the resin and laid onto the surface; and wherein the material is a fabric or a fleece.

6. The device of claim 5 wherein one of the first guide member and the second guide member has a distal end that is adjustably attached to the vessel to adjust a width of the passageway.

7. The device of claim 1 wherein the frame supports a rotatable holder that is sized and configured to hold a roll of the material such that the material is extendable from the holder to the vessel and is passable through the slot of the vessel and through the passageway.

8. The device of claim 1 wherein the material is a fabric or a fleece and wherein the first guide member is comprised of ultra-high density polyethylene and the second guide member is comprised of ultra-high density polyethylene.

9. The device of claim 1 further comprising an adjustment mechanism attached to at least one of the first guide member and the second guide member, the adjustment mechanism configured for adjusting a width of the passageway by moving at least one of a distal end of the first guide member and a distal end of the second guide member to adjust the width of the passageway.

10. The device of claim 1 further comprising an elongated member that is attached to the vessel and engages or contacts a distal end portion of the first guide member that is spaced from a distal end portion of the second guide member to define the outlet, the elongated member being rigid.

11. The device of claim 10 wherein a rigid member is positioned adjacent to the distal end portion of the second guide member to engage the distal end portion of the second guide member, the rigid member being attached to the frame or the vessel, and wherein a resilient layer of material is positioned between that rigid member and the second guide member.

12. A method of applying a reinforcing material for waterproofing or roofing of a structure comprising:

coating material with a liquid resin via a device; and laying the material saturated with the resin on a surface or a subsurface of the structure via the device being moved along the surface or the subsurface of the structure;

the device comprising:

a frame having wheels that contact the surface or the subsurface of the structure so that the device is moveable along the surface or the subsurface, a vessel for retaining the resin attached to the frame, the vessel having a slot sized and configured so that material is passable through the slot after being coated with resin retained in the vessel, a first guide member positioned adjacent the slot, a first portion of the first guide member being curved adjacent to the slot, a second guide member positioned adjacent the slot and being spaced apart from the first guide member to define a passageway between the first and second guide members, the passageway extending from below the slot to an outlet defined by the first and second guide members adjacent to a front of the device, the passageway sized and configured for the material to be passable through the passageway and out of the device for laying on the surface, a first portion of the second guide member being curved adjacent to the slot such that the passageway has a first portion that is curved and extends forwardly and downwardly from adjacent the slot and a second portion that extends linearly and forwardly from the first portion of the passageway to the outlet, and wherein the first portion of the first guide member and the first portion of the second guide member are curved to define the first portion of the passageway so that a pre-specified amount of resin is forced into the material prior to the material being emitted from the outlet and laid on the surface to saturate the material with the resin.

13. The method of claim 12 wherein the first and second guide members are immovably attached to the vessel so that the first and second guide members cannot move relative to the vessel.

14. The method of claim 12 wherein a front portion of the vessel defines a front edge of the slot and a rear portion of the vessel defines a rear edge of the slot, the slot being defined in the bottom of the vessel and the first and second guide members extending below the slot.

15. The method of claim 12 wherein the laying of the material comprises:

passing the material through the vessel of the device, through the slot of the vessel, and through the passageway for completely saturating the material with the resin prior to laying the saturated material on the surface or the subsurface; and rolling the wheels along the surface of the subsurface as the material is output from the device and laid on the surface or the subsurface;

wherein the second portion of the passageway is declined as it extends from the first portion of the passageway to the outlet and wherein the material is a fabric or a fleece.

16. The method of claim 15 wherein the material has a first side and a second side opposite the first side and the first and second sides of the material are saturated by the resin and wherein the material passes through the passageway such that the first side engages the first guide member and the second side engages the second guide member so that the pre-specific amount of resin is saturated in the material prior to the material being laid onto the surface or the subsurface.

17. The method of claim 16 wherein the first side of the material contacts the first guide member and the second side of the material contacts the second guide member when the material passes through the passageway; and wherein the first guide member is comprised of ultra-high density polyethylene and the second guide member is comprised of ultra-high density polyethylene.

18. The method of claim 12 comprising:

moving the device along the surface or along the subsurface and wherein the material is a fabric or a fleece and the structure is a roof.

19. The method of claim 12 further comprising:

adjusting a width of the passageway defined by the first and second guide members and wherein the material is a fabric or a fleece.

* * * * *